United States Statutory Invention Registration [19]

[11] Reg. Number: H732

Lutz [43] Published: Feb. 6, 1990

[54] POLYMER BLEND

[75] Inventor: Robert G. Lutz, Santa Rosa, Calif.

[73] Assignee: Shell Oil Company, Houston, Tex.

[21] Appl. No.: 208,691

[22] Filed: Jun. 20, 1988

[51] Int. Cl.[4] ..... C08F 283/00; C08G 14/00
[52] U.S. Cl. ..... 525/471; 525/529
[58] Field of Search ..... 525/529, 471

[56] References Cited

U.S. PATENT DOCUMENTS

| | | | |
|---|---|---|---|
| 2,495,286 | 1/1950 | Brubaker | 260/63 |
| 3,694,412 | 9/1972 | Nozaki | 260/63 |
| 3,948,832 | 4/1976 | Hugdin | 524/114 |
| 4,102,866 | 7/1978 | Speranza | 528/135 |
| 4,269,952 | 5/1981 | Locatelli | 525/507 |
| 4,306,054 | 12/1981 | Alber et al. | 528/95 |
| 4,329,276 | 5/1982 | Reardon | 525/185 |
| 4,499,255 | 2/1985 | Wang et al. | 528/95 |
| 4,795,774 | 1/1989 | Kluttz | 524/246 |

FOREIGN PATENT DOCUMENTS

| | | |
|---|---|---|
| 121965 | 10/1984 | European Pat. Off. . |
| 181014 | 5/1986 | European Pat. Off. . |
| 213671 | 3/1987 | European Pat. Off. . |
| 1081304 | 8/1967 | United Kingdom . |

*Primary Examiner*—John F. Terapane
*Assistant Examiner*—Richard Treanor

[57] ABSTRACT

Non-miscible blends comprising, as a major component, a linear alternating polymer of carbon monoxide and at least one ethylenically unsaturated hydrocarbon and, as a minor component, an oligomer derived from an epihalohydrin and a hydroxyphenylalkane, demonstrate improved processability.

5 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

POLYMER BLEND

FIELD OF THE INVENTION

This invention relates to an improved polymer blend comprising predominantly a linear alternating polymer of carbon monoxide and at least one ethylenically unsaturated hydrocarbon. More particularly, the invention relates to blends of the linear alternating polymer with an oligomer of epihalohydrin and a hydroxyphenylalkane.

BACKGROUND OF THE INVENTION

The class of polymers of carbon monoxide and olefin(s) has been known for some time. Brubaker, U.S. Pat. No. 2,495,286, prepared such polymers of relatively low carbon monoxide content in the presence of free radical initiators, e.g., peroxy compounds. U.K. Pat. No. 1,081,304 prepared polymers of higher carbon monoxide content in the presence of alkylphosphine complexes of palladium salts as catalyst. Nozaki extended the process to prepare linear alternating polymers by the use of arylphosphine complexes of palladium moieties and certain inert solvents. See, for example, U.S. Pat. No. 3,964,412.

More recently, the class of linear alternating polymers of carbon monoxide and at least one ethylenically unsaturated hydrocarbon has become of greater interest because of the greater availability of the polymers in quantity. These polymers, often referred to as polyketones or polyketone polymers, have been shown to be of the repeating formula —CO—(A)— wherein A is the moiety of ethylenically unsaturated hydrocarbon polymerized through the ethylenic unsaturation. By way of further example, when the unsaturated hydrocarbon is ethylene, the polymer will be of the repeating formula —CO—($CH_2$—$CH_2$)—. The general process for the more recent preparation of such polymers is illustrated by a number of Published European Patent Application Nos. including 121,965 and 181,014. The process typically involves a catalyst composition formed from a compound of a Group VIII metal selected from palladium, cobalt or nickel, the anion of a strong non-hydrohalogenic acid and a bidentate ligand of phosphorus, arsenic or antimony.

The resulting polymers are relatively high molecular weight thermoplastics having established utility in the preparation of shaped articles such as containers for food and drink and internal and external parts for the automotive industry, which articles are prepared by conventional methods. For some applications, it has been found desirable to have properties for a polymeric material which are somewhat different from those of the polyketone polymer. It would be of advantage to retain the more desirable properties of the polyketone polymer and yet improve other properties. These advantages are often obtained through the provision of a polymer blend.

SUMMARY OF THE INVENTION

The present invention contemplates the provision of blends of a linear alternating polymer of carbon monoxide and at least one ethylenically unsaturated hydrocarbon with certain other polymeric material. More particularly, according to the present invention there are provided blends of the linear alternating polymer and oligomers of epichlorohydrin and a hydroxyphenylalkane. Such blends demonstrate improved processability and permit processing of the polymer blend at higher operating temperatures without undue loss of crystallinity.

DESCRIPTION OF THE INVENTION

The polyketone polymers which are employed as the major component in the blends of the invention are linear alternating polymers of carbon monoxide and at least one ethylenically unsaturated hydrocarbon. Suitable ethylenically unsaturated hydrocarbons for use as precursors of the polyketone polymers have up to 20 carbon atoms inclusive, preferably up to 10 carbon atoms inclusive, and are aliphatic such as ethylene and other alpha-olefins including propylene, butylene, isobutylene, 1-hexene, 1-octene and 1-dodecene, or are arylaliphatic having an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, m-propylstyrene and p-ethylstyrene. Preferred polyketone polymers are copolymers of carbon monoxide and ethylene or terpolymers of carbon monoxide, ethylene and a second hydrocarbon of at least 3 carbon atoms, particularly an alpha-olefin such as propylene.

The structure of the polyketone polymers is that of a linear alternating polymer of carbon monoxide and ethylenically unsaturated hydrocarbon and the polymer will contain substantially one molecule of carbon monoxide for each molecule of unsaturated hydrocarbon. When terpolymers of carbon monoxide, ethylene and a second hydrocarbon are employed as components in the blends of the invention, there will be at least two units incorporating a moiety of ethylene for each unit incorporating a moiety of the second hydrocarbon. Preferably there will be from about 10 to about 100 units incorporating a moiety of ethylene for each unit incorporaiing a moiety of the second hydrocarbon. The polymer chain is therefore represented by the repeating formula $$-[CO-(CH_2-CH_2)]_x[CO-(G)]_y$$

wherein G is the moiety of the second ethylenically unsaturated hydrocarbon polymerized through the ethylenic unsaturation. The —CO—($CH_2$—$CH_2$)— units and the —CO—(G)— units occur randomly throughout the polymer chain and the ratio of y:x is no more than about 0.5. In the modification of the invention where copolymer of carbon monoxide and ethylene is employed as the blend component, there will be no second hydrocarbon present and the polyketone polymer is represented by the above formula wherein y is 0. When y is other than 0, i.e., terpolymers are employed, the ratio of y:x is preferably from about 0.01 to about 0.1. The end groups or "caps" of the polymer chain will depend upon what materials were present during the preparation of the polyketone polymer and whether and how the polyketone polymer was purified. The precise properties of the polymer will not depend upon the end groups to any considerable extent so that the polymer is fairly represented by the above formula for the polymer chain. Of particular interest are the polyketone polymers of number average molecular weight from about 1,000 to about 200,000, particularly those polyketones of number average molecular weight from about 20,000 to about 90,000 as determined by gel permeation chromatography. The physical properties of such polymers will depend in part on the molecular weight, whether the polymer is a copolymer of a terpolymer and, in the case of terpolymers, the proportion of the second hydrocarbon present. Typical melting points of such polymers are from about 175° C. to about 300° C., more frequently from about 210° C. to about 275° C. The polymers will have limiting viscosity numbers (LVN), as measured in a standard capillary viscosity measuring device in m-cresol at 60° C., of from about 0.5 to about 10, more often from about 0.8 to about 4.

A method of preparing the polymers which is now becoming conventional is to contact the carbon monoxide and unsaturated hydrocarbon(s) in the presence of a catalyst composition formed from a palladium compound, the anion of a non-hydrohalogenic acid having a pKa below about 6, preferably below about 2, and a bidentate ligand of phosphorus. The scope of the process of polyketone preparation is extensive but, without wishing to be limited, a preferred palladium compound is a palladium carboxylate, particularly palladium acetate, the preferred anion is the anion of p-toluenesulfonic acid or trifluoroacetic acid and a preferred bidentate ligand of phosphorus is 1,3-bis(diphenylphosphino)-propane or 1,3-bis[di(2-methoxyphenyl)phosphino]propane. Such a process for the polyketone preparation is illustrated by copending U.S. patent application Ser. No. 930,468, filed Nov. 14, 1986.

Polymerization is conducted in a gas phase in the substantial absence of diluent or in a liquid phase in the presence of an inert liquid diluent such as an alkanol, e.g., methanol or ethanol. The reactants are contacted under polymerization conditions in the presence of the catalyst composition by conventional methods such as shaking or stirring in a reaction vessel. Suitable reaction temperatures are from about 20° C. to about 150° C., preferably from about 50° C. to about 135° C. Typical reaction pressures are from about 1 bar to about 200 bar, more typically from about 10 bar to about 100 bar. Subsequent to reaction the polymer is recovered as by filtration or decantation. The polymer product may contain residues of the catalyst composition which are removed, if desired, by treatment with a solvent or complexing agent which is selective for the residues.

The minor component of the blends of the invention is an oligomer, i.e., a relatively low molecular weight polymer, having moieties derived from an epihalohydrin and a hydroxyphenylalkane. These oligomers are typically prepared by condensation of an epihalohydrin, preferably epichlorohydrin, and a hydroxyphenylalkane to prepare glycidyl ethers of the hydroxyphenylalkane moieties which are possibly joined depending upon the structure of the hydroxyphenylalkane, by 2-hydroxypropane ether groups. Such oligomers occur in a number of structural types but are well known in the art. In one modification, the oligomer is an alternating oligomer characterized by alternating bis(oxyphenyl)alkane and 2-hydroxypropane moieties and is capped with glycidyl groups. One class of such alternating oligomers is represented by the formula wherein R′ is alkylidine of up to 8 carbon atoms inclusive, is alkyl, preferably lower alkyl of up to 4 carbon atoms inclusive, or halo, preferably middle halogen chloro or bromo, r is an integer from 0 to 4 inclusive and n is a number from 0 to about 40, preferably from 0 to about 20. It will be appreciated that within a given oligomer sample there will be oligomer molecules which will have differing values for n, so that, on average, n is not necessarily a whole number.

Such oligomers are prepared by conventional reaction of epihalohydrin, e.g., epichlorohydrin, and a bis(-hydroxyphenyl)alkane of the formula

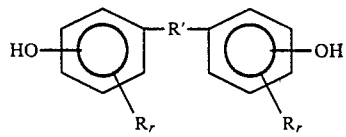

wherein R', R and r have the previously stated meanings. Such bis(hydroxyphenyl)alkanes are illustrated by 2,2-bis(4-hydroxyphenyl)propane (bisphenol acetone or BPA), bis(4-hydroxyphenyl)methane, 3,3-bis-(3-hydroxy-4-chlorophenyl)octane. 2,2-bis(3-hydroxy-4-methyl-phenyl)heptane, 2,2-bis(4-hydroxy-3,5-dibromophenyl)-propane, bis(2-hydroxy-4-ethyl-phenyl)methane and 2,2-dimethyl-3,3-bis(4-hydroxy-phenyl)hexane. In a typical reaction, excess epihalohydrin and bis(hydroxyphenyl)alkane are mixed and heated in the presence of an alkali metal base, e.g., sodium hydroxide, to effect oligomerization and to remove any water present or formed by distillation, typically azeotropic distillation with a portion of the epichlorohydrin. After removal of any unreacted epihalohydrin, the resulting oligomer is typically dissolved in an organic solvent such as toluene and washed with water to remove the sodium chloride byproduct. The oligomer is recovered by conventional methods as by solvent removal. Such reaction procedures are well known and conventional and are illustrated by the disclosures of Locatelli, U.S. Pat. No. 4,269,952, Alber et al, U.S. Pat. No. 4,306,054 and Wang et al, U.S. Pat. No. 4,499,255. A number of the oligomers are commercial and are marketed by a number of producers including Shell Chemical Company which markets the oligomers under the trademark EPON ® Epoxy Resin.

The preferred alternating oligomers of this type are those derived from 2,2-bis(4-hydroxyphenyl)propane which are represented by the formula wherein n is a number from about 5 to about 20, preferably a number from about 8 to 15.

In an alternate although generally less preferred modification, the epihalohydrin/hydroxyphenylalkane oligomers are polyglycidyl ethers of a poly(hydroxyphenylalkane). One class of such oligomers is represented by the formula

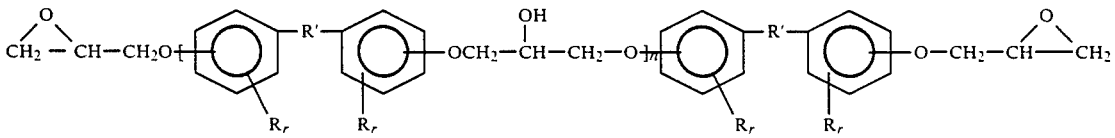

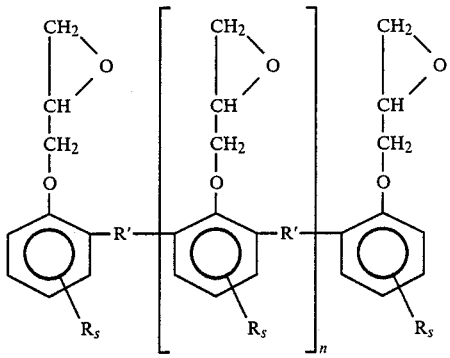

wherein R', and R have the previously stated meanings and s is an integer from 0 to 3 inclusive. Such oligomers are prepared by conventional procedures such as that described above wherein epihalohydrin is reacted with a poly(hydroxyphenylalkane) of the type conventionally referred to as Novolac resins. The Novolac resins are prepared by conventional reaction of a phenol and an aldehyde, frequently formaldehyde. The disclosure of Speranza et al, U.S. Pat. No. 4,102,866, is illustrative.

The blends of the invention comprise a mixture of a major proportion of the polyketone polymer and a minor proportion of the epihalohydrin/hydroxyphenylalkane oligomer. The precise proportion oi the oligomer to be employed in the blends of the invention is no critical and amounts of epihalohydrin/hydroxyphenylalkane oligomer from about 0.5% by weight to about 45% by weight, based on total blend, are satisfactory. Amounts of epihalohydrin/hydroxyphenylalkane oligomer from about 1% by weight to about 20% by weight on the same basis are preferred.

The method of preparing the blend of the polyketone polymer and the epihalohydrin/hydroxyphenylalkane oligomer is not material so long as a relatively uniform mixture of the oligomer throughout the polyketone polymer is obtained. The blend of polyketone and epihalohydrin/hydroxyphenylalkane oligomer is a non-miscible blend with the oligomer existing as a discrete phase in the polyketone matrix having a phase size from about 0.5 micron to about 1.5 micron, more typically on the order of one micron. The blend will not, therefore, be homogeneous but good results are obtained when the distribution of the oligomer throughout the polyketone polymer matrix is substantially uniform. The method of blending the components is that which is conventional for non-miscible polymeric materials. In one modification, the materials in particulate form are mixed and passed through an extruder operating at a high RPM to prepare the blend as an extrudate. In an alternate modification, the components are blended in a mixing device which exhibits high shear.

The blends of the invention may also include conventional additives such as antioxidants, stabilizers, fillers, fire retardant materials, mold release agents and other substances which are added to increase the processability of the components or improve the properties of the resulting blend. Such additives are incorporated by conventional methods prior to, together with or subsequent to the blending of the components.

The blends of the invention are characterized by improved processability as evidenced by increased feed rates during melt processing. The blends retain melt stability comparable to the polyketone component and can be processed without increased loss of crystallinity at elevated operating temperatures in comparison to the polyketone component alone. As a result, the blends are of particular utility where preparation of articles by processes employing molten polymer is desired. The blends are processed by conventional techniques such as injection molding and extrusion into plates, films, sheets and shaped articles which find application in the packaging industry, in the preparation of containers as for food and drink and in the preparation of external and internal parts for the automotive industry.

The invention is further illustrated by the following Illustrative Embodiments which should not be regarded as limiting the invention.

Illustrative Embodiment I

A linear alternating terpolymer of carbon monoxide, ethylene and propylene was prepared in the presence of a catalyst composition formed from palladium acetate, the anion of p-toluenesulfonic acid and 1,3-bis(diphenylphosphino)propane. The melting point of the polymer was 225° C. and the polymer had a limiting viscosity number, measured in m-cresol at 60° C., of 1.72.

Illustrative Embodiment II

A blend was prepared of the polyketone polymer of Illustrative Embodiment I and 10% by weight based on total blend, of an alternating oligomer derived from epichlorohydrin and 2,2-bis(4-hydroxyphenyl)propane. The oligomer had a molecular weight of about 4,000 and a glass transition temperature of 135° C. The polyketone polymer, the alternating oligomer and approximately 0.2% by weight, based on total polymer of Irganox 1076 Antioxidant, a conventional hindered phenolic antioxidant to provide background stabilization, were processed through a 15 mm twin screw Baker Perkins Extruder. A sample of the polyketone polymer, containing 0.2% by weight Irganox 1076, was also extruded as a control. The extruder temperature was 240° C. operating with undried feed and under a nitrogen blanket. The feed rate of the blend during extrusion was nearly double the feed rate for the polyketone control. The extuder was operated at maximum RPM to give a residence time of 0.5 minutes and the extruded strands were passed directly into water. The resulting polymeric blend was non-miscible as evidenced by examination of cold-cut samples, stained with ruthenium tetroxide; under an electron microscope. The alternating oligomer was present as a discrete phase having a particle size approximately 1 micron in diameter.

Illustrative Embodiment III

The melt stability of the blend of Illustrative Embodiment II as well as the polyketone polymer control from which t was prepared was determined by measuring the melting temperatures and the heats of melting and crystallization of the polyketone in the blend and the polyketone control after exposure to elevated temperature. Measurements were made in a Perkin-Elmer DSC 7 differential scanning calorimeter (DSC) which employed samples of the blend and the polyketone polymer control in sealed pan containers. The pan and contents are heated at a constant rate, typically 20° C./minute, until the sample has melted. The pan and contents are cooled until the sample has solidified and the heated past a second melting point to 285° C. at which temperature the sample is maintained for 10 minutes. The pan and contents are then cooled until the sample has solidified a second time. The melting temperature ("T", °C.) is defined as the temperature at which the heat flow reaches a maximum. It is also possible through the use of the DSC to determine the magnitude o: the first and second heats of melting ($H_1$ and $H_2$) and the first and second heats of crystallization ($C_1$ and $C_2$) for the polyketone in the blend and also for the polyketone polymer control. Typically the values for the melting temperature and heats of melting and crystallization will decrease upon repeated melting/solidification cycles as the apparent crystallinity of the sample decreases. The higher the heats of melting and crystallization, the higher the degree of retained crystallinity and thus the greater the melt stability of the polymer or blend undergoing the test. The DSC data are shown in the following Table for the polyketone in the blend and in the polyketone polymer control. The values for the blend are corrected for the amount of alternating oligomer present in the blend. Temperatures are measured in °C. and heats are given in cal/g. The heats of melting and crystallization are comparable for the two samples while the blend shows an increase in first melting temperature.

TABLE

| % Oligomer (wt) | $T_1$ | $T_2$ | $H_1$ | $C_1$ | $H_2$ | $C_2$ |
|---|---|---|---|---|---|---|
| 0 | 230.1 | 224.2 | 22.3 | 17.20 | 18.5 | 13.43 |
| 10 | 238.2 | 224.6 | 22.8 | 17.06 | 18.6 | 12.09 |

What is claimed is:

1. A composition comprising a non-miscible blend of, as a major component, a linear alternating polymer of carbon monoxide and at least one ethylenically unsaturated hydrocarbon and, as a minor component as oligomer derived from spihalohydrin and a hydroxyphenylalkane.

2. The composition of claim 1 wherein the oligomer is an alternating oligomer of bis(oxyphenyl)alkane moieties and 2-hydroxypropane moieties and is capped with glycidyl groups.

3. The composition of claim 2 wherein the oligomer is represented by the formula

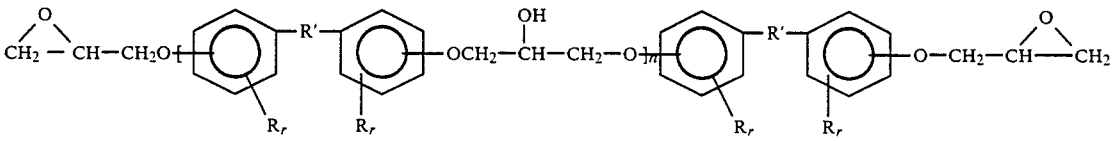

wherein R' is alkylidine of up to 8 carbon atoms inclusive, R is lower alkyl or middle halogen, r is an integer from 0 to 4 inclusive and n is a number from 0 to about 40.

4. The composition of claim 3 wherein the oligomer is represented by the formula

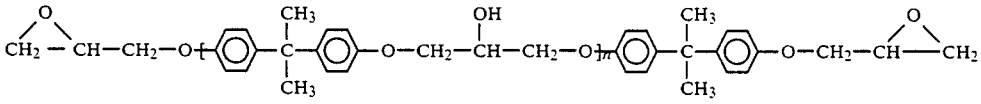

5. The composition of claim 1 wherein the oligomer is a polyglycidyl ether of a poly(hydroxyphenylalkane).

* * * * *